(12) United States Patent
Takata et al.

(10) Patent No.: US 8,861,110 B2
(45) Date of Patent: Oct. 14, 2014

(54) FAILURE PREDICTION METHOD AND FAILURE PREDICTION SYSTEM

(75) Inventors: Soichiro Takata, Tokyo (JP); Shigeki Shinoda, Tokyo (JP); Shigeru Kasai, Tokyo (JP); Nobuhiro Mikami, Tokyo (JP); Yasuhiro Sasaki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/240,016

(22) PCT Filed: Aug. 15, 2012

(86) PCT No.: PCT/JP2012/071116
§ 371 (c)(1),
(2), (4) Date: Feb. 20, 2014

(87) PCT Pub. No.: WO2013/027744
PCT Pub. Date: Feb. 28, 2013

(65) Prior Publication Data
US 2014/0219071 A1   Aug. 7, 2014

(30) Foreign Application Priority Data
Aug. 23, 2011   (JP) .................... 2011-181691

(51) Int. Cl.
*G11B 27/36* (2006.01)
*G11B 7/00* (2006.01)
*G11B 20/18* (2006.01)
(52) U.S. Cl.
CPC ...................................... *G11B 20/18* (2013.01)
USPC ............ 360/31; 360/39; 369/53.1; 369/53.12

(58) Field of Classification Search
None
See application file for complete search history.

(56) References Cited

U.S. PATENT DOCUMENTS 7,324,909 B2 * 1/2008 Yasukawa et al. ............. 702/115
8,291,264 B2 * 10/2012 Scholer et al. .................. 714/26

FOREIGN PATENT DOCUMENTS

| JP | 2001-265538 | 9/2001 |
| JP | 2002-272172 | 9/2002 |
| JP | 2004-063040 | 2/2004 |
| JP | 2009-266291 | 11/2009 |

OTHER PUBLICATIONS

International Search Report corresponding to International Application No. PCT/JP2012/071116, Sep. 12, 2012, 5 pages.

* cited by examiner

*Primary Examiner* — Muhammad N Edun
(74) *Attorney, Agent, or Firm* — Wilmer Cutler Pickering Hale and Dorr LLP

(57) ABSTRACT

A failure prediction system for performing failure prediction to a monitoring target device by detecting a state, comprising: a state detection unit for detecting state signals of no smaller than two different kinds, and outputting a detection signal corresponding to each of the state signals; a phase processing part for synchronizing a plurality of the detection signals; a signal analysis part for calculating a feature value indicating a feature of the state for each of the detection signals from the phase processing part; and a failure prediction part for performing failure prediction of the monitoring target device for each of the feature values by comparing the feature value in question and a reference value set in advance.

16 Claims, 11 Drawing Sheets

Fig.7

| | CONVENTIONAL METHOD 1 (VIBRATION MONITORING) | CONVENTIONAL METHOD 2 (CURRENT MONITORING) | PRESENT INVENTION METHOD (VIBRATION AND CURRENT MONITORING) |
|---|---|---|---|
| FAILURE PREDICTION | ○ | ○ | ◎ |
| FAILURE SIGN DETECTION | △ | △ | ○ |

FAILURE PREDICTION METHOD AND FAILURE PREDICTION SYSTEM

CROSS-REFERENCE TO RELATED APPLICATIONS

This application is a national stage application of International Application No. PCT/JP2012/071116 entitled "Failure Prediction Method and Failure Prediction System," filed on Aug. 15, 2012, which claims the benefit of the priority of Japanese patent application No. 2011-181691, filed on Aug. 23, 2011, the disclosures of each of which are hereby incorporated by reference in their entirety.

TECHNICAL FIELD

The present invention relates to a failure prediction method and a failure prediction system to perform failure prediction of an electronic apparatus from a plurality of pieces of detected information.

BACKGROUND ART

Development of the Internet technology is contributing to the popularization of precision electronic equipment such as a computer. Into such personal computer, there are mounted a storage device such as a hard disk drive and a magnetooptic device, and a mechanical component such as a cooling fan. On the other hand, along with popularization of a personal computer, demands for maintaining data safely have become strong.

For example, for a storage device, capacity increase of a storage capacity is required, and also required is to store various kinds of data such as image data and analytical data safely and certainly.

Accordingly, in Japanese Patent Application Laid-Open No. 2002-272172, for example, a technology for detecting abnormality of a hard disk by monitoring an electric current supplied from a motor driver circuit to a fluid-dynamic-bearing spindle motor is being proposed.

DISCLOSURE OF THE INVENTION

However, in the structure according to Japanese Patent Application Laid-Open No. 2002-272172, there are cases where it is difficult to perform failure prediction with a high degree of accuracy because a detection signal is only an electric current. A hard disk is equipped with many movable sections such as a spindle motor, a magnetic head, a slider, a head arm and a voice coil motor, and electronic circuits such as a motor driver circuit. Furthermore, a change in a current supply amount to a spindle motor occurs not only when the spindle motor itself is in trouble but also when a motor driver circuit is in trouble. In addition, even if the spindle motor and the motor driver circuit are normal, it occurs when a sliding property declines due to wearing of movable sections driven by the spindle motor. Accordingly, because an abnormal portion cannot be identified from detected information only on a current supply amount like the case of the technology according to Japanese Patent Application Laid-Open No. 2002-272172, there are cases where an incorrect prediction is caused.

Therefore, a main objective of the present invention is to provide a failure prediction method and a failure prediction system which performs failure prediction by judging a failed portion based on a plurality of pieces of detected information.

MEANS FOR SOLVING THE PROBLEM

In order to settle the above-mentioned problem, the invention about a failure prediction system includes: a state detection unit for detecting state signals of no smaller than two different kinds, and outputting a detection signal corresponding to each of the state signals; a signal analysis part for calculating a feature value indicating a feature of a state for each of the detection signals from the phase processing part; and a failure prediction part for performing failure prediction of a monitoring target device for each of the feature values by comparing the feature value in question and a reference value set in advance.

The invention about a failure prediction method includes: a detection procedure for detecting state signals of no smaller than two different kinds, and outputting a detection signal corresponding to each of the state signals; a phase processing procedure for synchronizing a plurality of the detection signals; a signal analysis procedure for calculating a feature value indicating a feature of a state for each of the detection signals from the phase processing part; and a failure prediction procedure for performing failure prediction of a monitoring target device for each of the feature values by comparing the feature value in question and a reference value set in advance.

ADVANTAGE OF THE INVENTION

According to the present invention, because failure prediction is performed by judging a failed portion based on a plurality of pieces of detected information, a portion in which a failure is predicted can be identified, and failure prediction with high accuracy can be performed.

BRIEF DESCRIPTION OF THE DRAWINGS

FIG. 7 is a diagram of comparing a failure prediction result of a failure prediction system according to the first exemplary embodiment with conventionally methods;

BEST MODE FOR CARRYING OUT THE INVENTION

First Exemplary Embodiment

Figure 1:
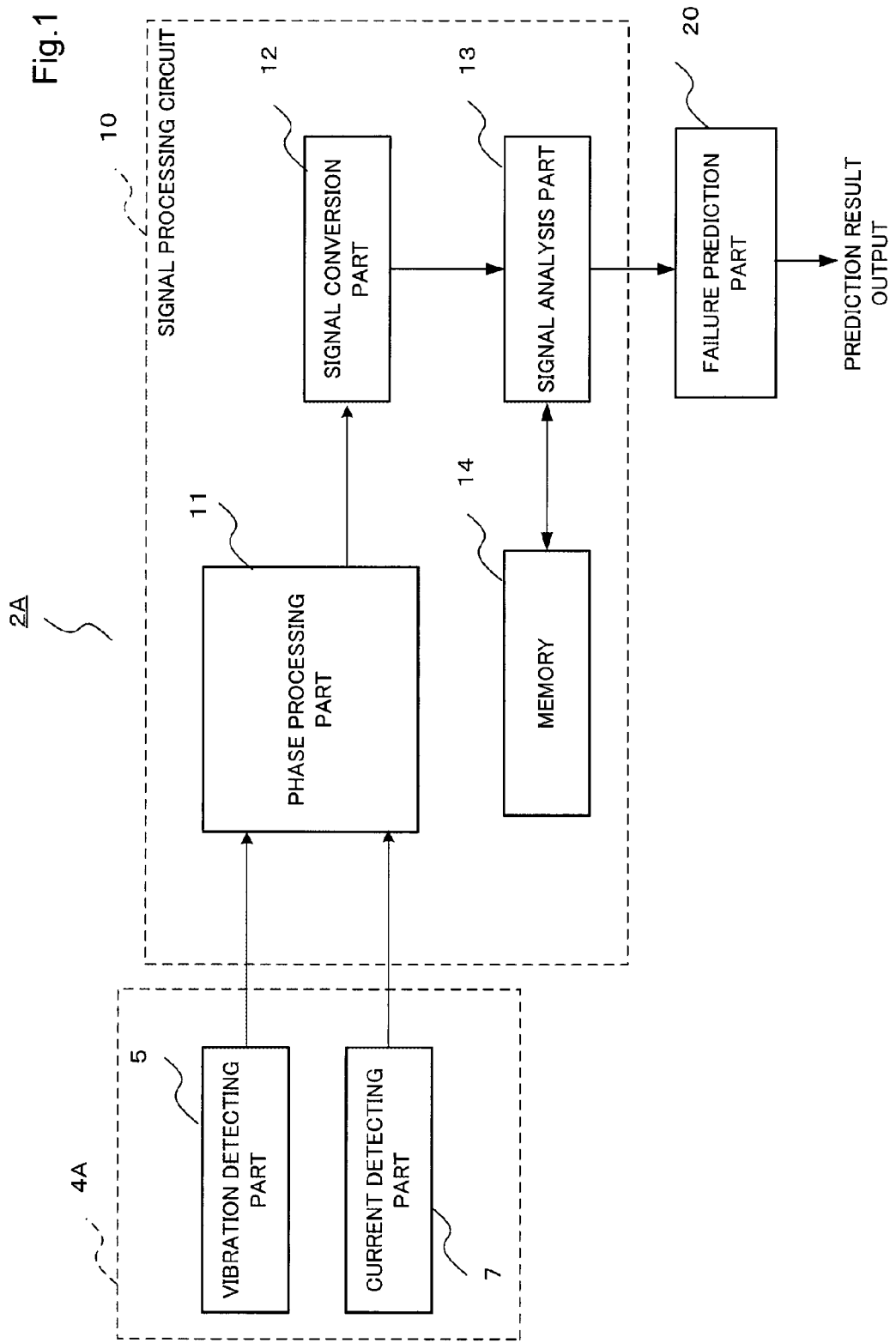
FIG. 1 is a block diagram of a failure prediction system according to a first exemplary embodiment of the present invention.

The first exemplary embodiment of the present invention will be described. FIG. 1 is a block diagram of a failure prediction system 2A according to this exemplary embodiment. Meanwhile, an apparatus to which failure prediction is performed is described as a monitoring-target device in the present specification. Although a term of failure prediction is used in the present specification, the term includes prediction processing for predicting a failure of a monitoring-target device and also failure sign detection processing for detecting a sign of a failure.

The failure prediction system 2A includes a state detection unit 4A, a signal processing circuit 10 and a failure prediction part 20 as a main configuration. The state detection unit 4A includes a vibration detecting part 5 and a current detecting part 7. The signal processing circuit 10 includes a phase processing part 11, a signal conversion part 12, a signal analysis part 13 and a memory 14.

The vibration detecting part 5 is fixed to a monitoring target device, and detects vibration of the device. A detected vibration is inputted to the phase processing part 11 as a vibration signal. As such vibration detecting part 5, an acceleration sensor of a piezoelectric type can be exemplified.

The current detecting part 7 detects an electric current supplied to the monitoring target device. A detected current amount is inputted to the phase processing part 11 as a current signal. As such current detecting part 7, a Hall sensor can be shown as an example.

The phase processing part 11 in the signal processing circuit 10 adjusts timing between the vibration signal and the current signal. That is, the phase of the current signal is adjusted so that the vibration signal and the current signal may synchronize. The signal conversion part 12 converts the vibration signal and the current signal to which phase adjustment has been performed into digital signals. Meanwhile, at that time, for frequencies of a vibration signal and a current signal, a vibration signal and a current signal of a predetermined band can be used. In other words, there are cases where a vibration signal and a current signal include various kinds of noise. When failure prediction processing is performed using a signal including noise, prediction accuracy declines. Accordingly, it is made such that noise or the like is removed using a bandpass filter or the like to perform proper failure prediction.

The memory 14 stores an amplitude maximum value, a maximum amplitude time, a current maximum value and a maximum current time that will be mentioned later, and also stores a vibration reference value and a time reference value and the like. These amplitude maximum value, maximum amplitude time, current maximum value and maximum current time may be described as a feature value. The failure prediction part 20 performs failure prediction mentioned later based on an analysis signal from the signal processing circuit 10.

Figure 2:
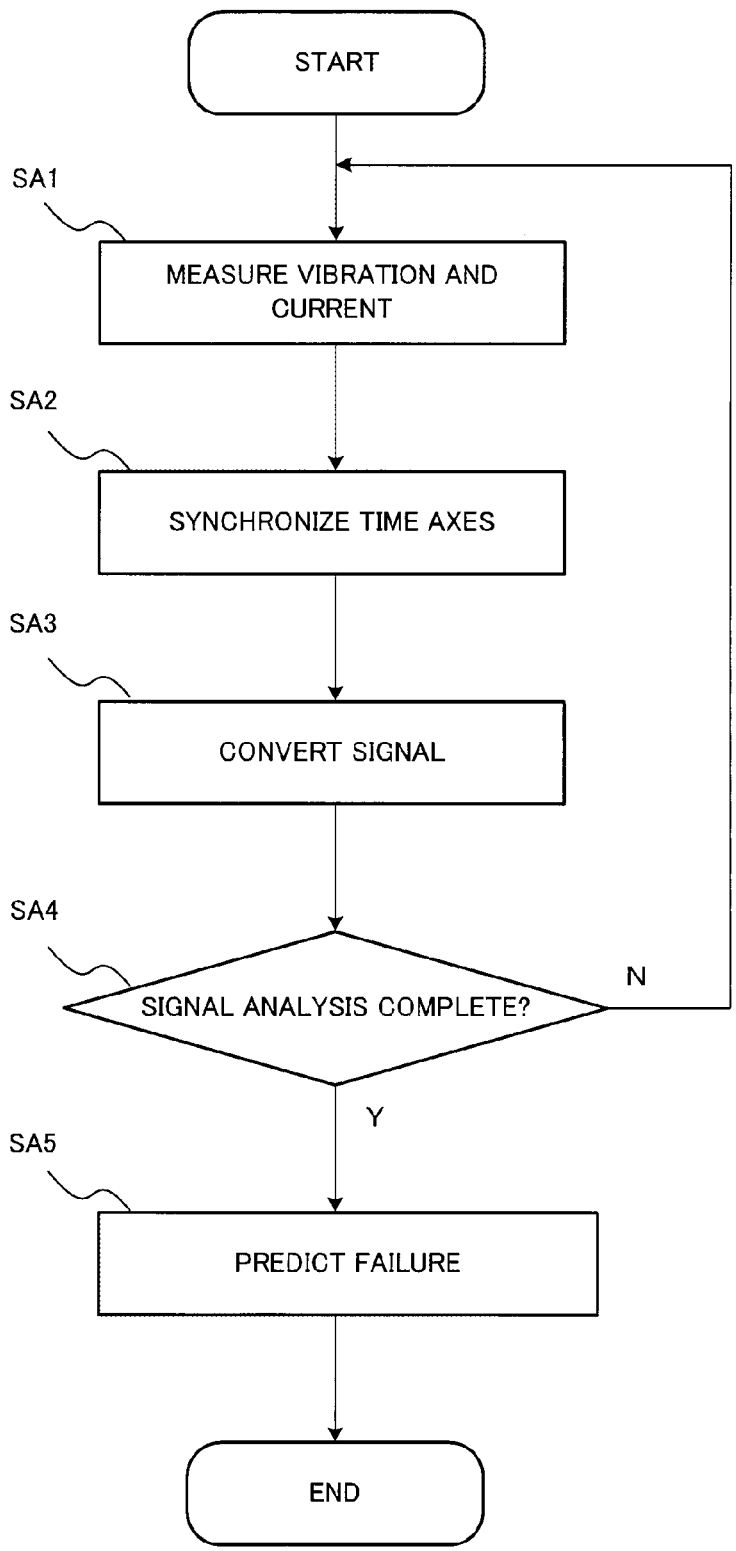
FIG. 2 is a flow chart which shows failure prediction processing of a failure prediction system according to the first exemplary embodiment.

Next, failure prediction processing of such failure prediction system 2A will be described according to the flow chart shown in FIG. 2.

Step SA1: First, the vibration detecting part 5 detects a vibration of a monitoring target device as a vibration signal. The current detecting part 7 detects an electric current supplied to the monitoring target device as a current signal.

Step SA2: The vibration signal and current signal are inputted to the phase processing part 11. Then, the phase processing part 11 adjusts the phases so that the time axes of the vibration signal and the current signal may become identical. An electric current which the current detecting part 7 detects is a drive current of the monitoring target device. The monitoring target device is driven by this drive current, and causes a vibration. That is, it can be thought that the vibration has occurred as a result of the current supply. Accordingly, the phase processing part 11 synchronizes the current signal and the vibration signal by delaying the phase of the current signal. Referring to a synchronizing method, a time difference between these is acquired in a manner making a time when a current signal has changed suddenly (when supply of an electric current has been begun, for example) and a time when a vibration has changed suddenly (when the vibration has been detected, for example) identical, for example. The vibration signal and the current signal can be synchronized by delaying a current signal only by the acquired time difference. Of course, a synchronizing method is not limited to this.

Step SA3: After that, the signal conversion part 12 converts the vibration signal and the current signal into digital signals so as to be able to perform a logical judgment in the signal analysis part 13 and the failure prediction part 20.

Step SA4, SA5: The signal analysis part 13 and the failure prediction part 20 perform signal analysis and failure prediction by signal analysis processing and failure prediction processing mentioned later.

Such signal analysis processing and failure prediction processing will be described with reference to the flow chart shown in FIG. 3.

Step SB1: The signal analysis part 13 acquires a vibration signal and a current signal that are inputted in a predetermined time interval. Hereinafter, data acquired in this way is described as frame data. Accordingly, frame data of a vibration signal and frame data of a current signal will exist in frame data.

Step SB2: After that, the signal analysis part 13 acquires a maximum value and the time when it has occurred among pieces of frame data. Regarding a maximum value and a time to be acquired, maximum values and times corresponding to a vibration signal and a current signal, respectively, will be acquired because frame data of a vibration signal and frame data of a current signal exist in frame data.

Step SB3: Acquired maximum values and times are stored in the memory 14 as an amplitude maximum value, a maximum amplitude time, a current maximum value and a maximum current time.

Meanwhile, an amplitude maximum value, a maximum amplitude time, a current maximum value and a maximum current time having been acquired first at a time when signal analysis processing has been begun are stored in the memory 14 as a vibration initial value, a vibration initial time, a current initial value and a current initial time. By storing an amplitude maximum value and the like thus, a vibration signal and a current signal do not need to be memorized in real time just as it is, and it becomes possible to make the storage capacity of the memory 14 small. Also, a processing load needed for signal analysis processing and failure prediction processing becomes small because a volume of data to be handled becomes small. For this reason, there is an advantage that such signal analysis processing and failure prediction processing can be performed using an inexpensive microcomputer and the like.

Step SB4: The signal analysis part 13 calculates vibration change rate Δm, current change rate Δc and time change rate Δt defined by following Formula 1-3.

$$\Delta m = ((\text{amplitude maximum value} - \text{vibration initial value})/\text{vibration initial value}) * 100 \quad (1)$$

$$\Delta c = ((\text{current maximum value} - \text{current initial value})/\text{current initial value}) * 100 \quad (2)$$

$$\Delta t = (((\text{maximum amplitude time} - \text{maximum current time}) - (\text{vibration initial time} - \text{current initial time}))/(\text{vibration initial time} - \text{current initial time})) * 100 \quad (3)$$

Step SB5, SB6: The failure prediction part 20 judges whether vibration change rate Δm, current change rate Δc and time change rate Δt calculated by the signal analysis part 13 are larger than a vibration reference value Dm, a current reference value Dc and a time reference value Dt set in advance. Here, as the vibration reference value Dm, current change rate Dc and the time reference value Dt, 20 [%] can be exemplified. Hereinafter, a big-and-small judgment between vibration change rate Δm and the vibration reference value Dm is described as a first diagnosis, a big-and-small judgment between current change rate Δc and the current reference value Dc a second diagnosis, and a big-and-small judgment between time change rate Δt and the time reference value Dt a third diagnosis.

At that time, when vibration change rate Δm is judged by the first diagnosis to be larger than the vibration reference value Dm (Δm≥Dm), or when current change rate Δc is judged by the second diagnosis to be larger than the current reference value Dc (Δc≥Dc) or when time change rate Δt is judged by the third diagnosis to be larger than the time reference value Dt (Δt≥Dt), the failure prediction part 20 judges that a failure has been predicted in a monitoring target device or a sign of a failure has been detected in the monitoring target device. On the other hand, in a case of Δm<Dm, Δc<Dc or Δt<Dt, the failure prediction part 20 judges that a monitoring target device is in an acceptable range (in the normal range where a failure is not predicted).

It can be thought that such failure has occurred due to abnormality of a movable mechanism or abnormality of an electronic circuit caused by a long-term deterioration or the like of the monitoring target device. At that time, the following first to third abnormality modes are considered from a result of the first diagnosis and the second diagnosis. The first abnormality mode is a mode when Δm≥Dm and Δc<Dc, that is, although an amount of change of vibration is large, an amount of change of an electric current is small. The second abnormality mode is a mode when Δc≥Dc and Δm<Dm, that is, although an amount of change of vibration is small, an amount of change of an electric current is large. The third abnormality mode is a mode when Δc≥Dc and Δm≥Dm, that is, an amount of change of vibration is large and an amount of change of an electric current is also large.

Further, a judgment of whether it has been judged as Δt≥Dt by a result of the third diagnosis is added to the first-third abnormality modes mentioned above. That is, six abnormal states can be judged. Accordingly, identification of a failed portion and failure prediction can be performed correctly.

The failure prediction part 20 outputs these prediction results as failure prediction. Meanwhile, in the above-mentioned description, although the vibration reference value Dm, the current reference value Dc and the time reference value Dt are made to be a single value, respectively, they can be made to be a plurality of values, respectively. For example, the vibration reference value Dm is made to be 10% and 20%. Then, it may be diagnosed as: when Δm≥20%, a failure prediction state in which a failure is predicted; when 20%>Δm≥10%, a failure sign state; and when 10%>Δm, a normal state.

Figure 4:
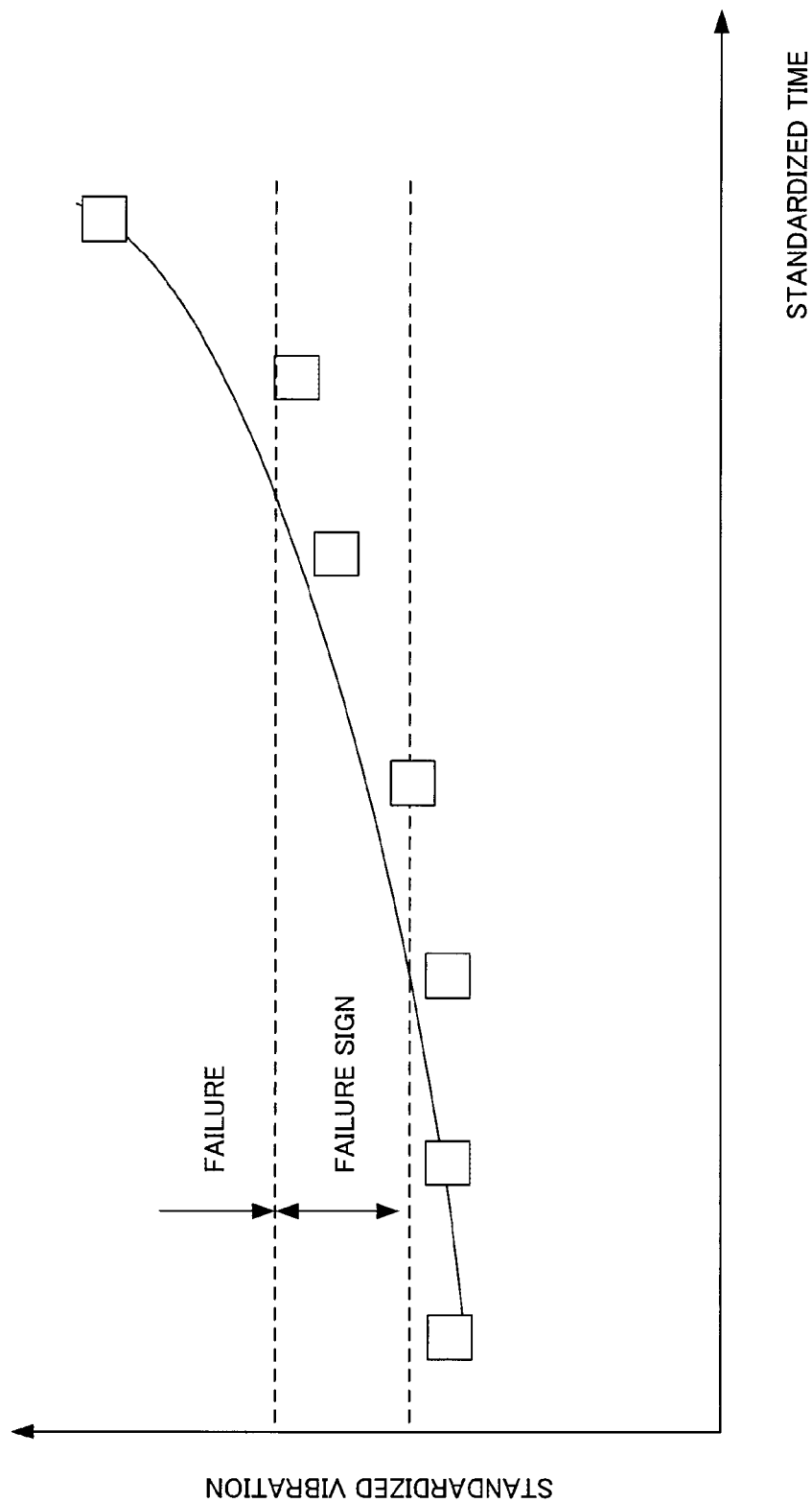
FIG. 4 is a diagram showing an evaluation result of failure prediction performed based on a vibration signal according to the first exemplary embodiment.
Figure 5:
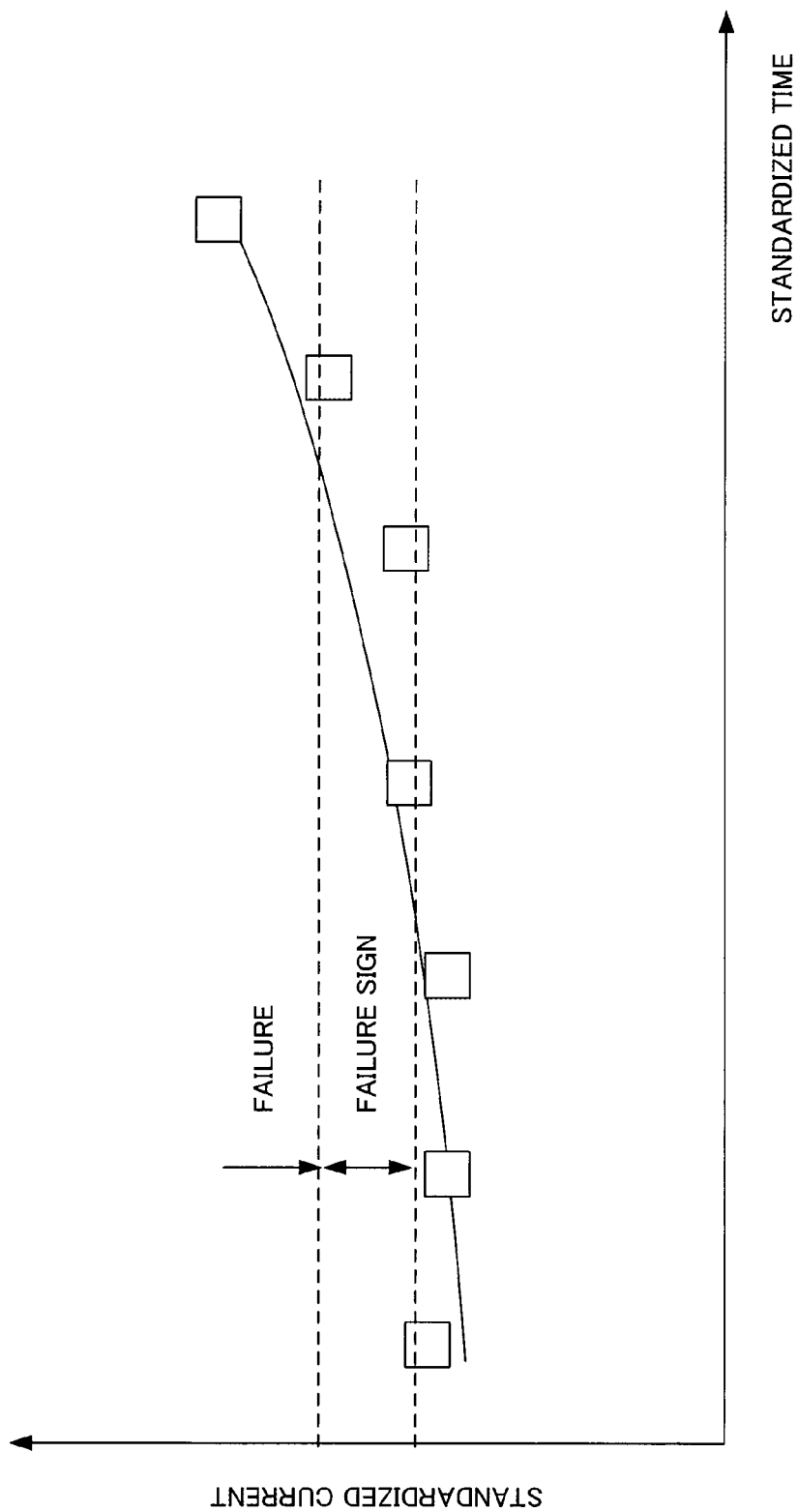
FIG. 5 is a diagram showing an evaluation result of failure prediction performed based on a current signal according to the first exemplary embodiment.
Figure 6:
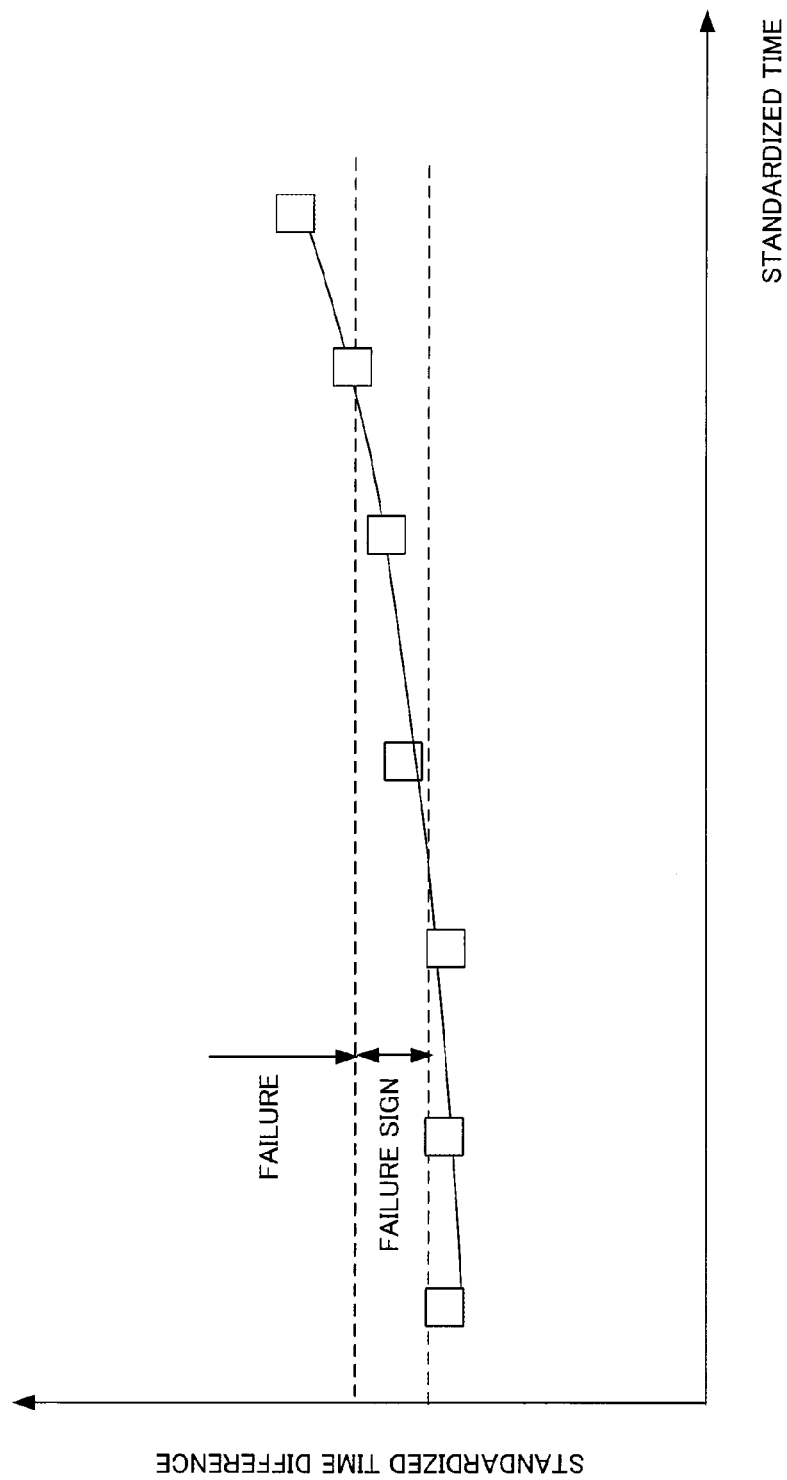
FIG. 6 is a diagram showing an evaluation result of failure prediction performed based on a time change rate according to the first exemplary embodiment.

FIG. 4 is a diagram showing an evaluation result of failure prediction performed based on a vibration signal. FIG. 5 is a diagram showing an evaluation result of failure prediction performed based on a current signal. FIG. 6 is a diagram showing an evaluation result of failure prediction performed based on a time change rate. Meanwhile, the evaluations have been performed using a hard disk as a monitoring target device and by carrying out random read/write operations under the normal temperature environment. The horizontal axis of each of the figures is a standardized time made by standardizing a maximum amplitude time by the running time when a monitoring target device has failed. The vertical axis of FIG. 4 is a standardized vibration made by standardizing an amplitude maximum value by a vibration value when a monitoring target device has failed, and the vertical axis of FIG. 5 is a standardized current made by standardizing a current maximum value by the current value when a monitoring target device has failed. The vertical axis of FIG. 6 is a standardized time difference made by standardizing a time difference (=amplitude maximum value−vibration initial value) by the time difference when a monitoring target device has failed. In FIGS. 4-6, there are shown a failure sign area and a failure area that are zoned using two vibration reference values and two current reference values. The dotted lines in the Figures are zoning such area.

As it may be understood from FIGS. 4-6, the more a running time increases, the more the standardized vibration value, the standardized current value and the standardized time difference increase monotonously. From this, it can be understood that an area separation to a failure sign area and a failure area is possible according to the vibration reference value or the like.

FIG. 7 indicates results of cases: when failure prediction is performed only based on a vibration signal (it is described as a conventional method 1); when failure prediction is performed only based on a current signal (it is described as a conventional method 2); and when failure prediction is performed based on a vibration signal and a current signal (it is described as the present invention method). Meanwhile, a result of failure sign detection is also indicated. In this figure, a symbol Δ shows that failure prediction (failure sign detection) has been able to be successfully performed although it is of low accuracy, a symbol ○ shows that failure prediction (failure sign detection) of a medium accuracy has been able to be successfully performed, and a symbol ◎ shows that failure prediction (failure sign detection) has been able to be successfully performed with a high accuracy. As is understood from FIG. 7, the present invention method indicates a excellent result compared with each of the conventional methods 1 and 2.

As it has been described above, it becomes possible to perform failure prediction and a failure sign detection of a monitoring target device with a high degree of accuracy using a simple method. Because various detection signals acquired by a vibration detecting part and a current detecting part and the like are corrected by a phase processing part so that the time axes of these may become identical, it becomes possible to associate even signals of different kinds. Accordingly, a compositive judgment in which a result of failure prediction based on a current signal is taken into account of in a result of failure prediction based on a vibration signal, for example, becomes possible.

In the first exemplary embodiment, a vibration signal and a current signal are detected, and a maximum value and a time at that time are acquired. Then, failure prediction is performed from change rates of these. However, the present invention is not limited to the vibration signal and the current signal as a physical quantity to be measured. In this exemplary embodiment, it is made such that more detailed failure prediction diagnosis can be performed by making a temperature of a monitoring target device be also a detection target.

Figure 8:
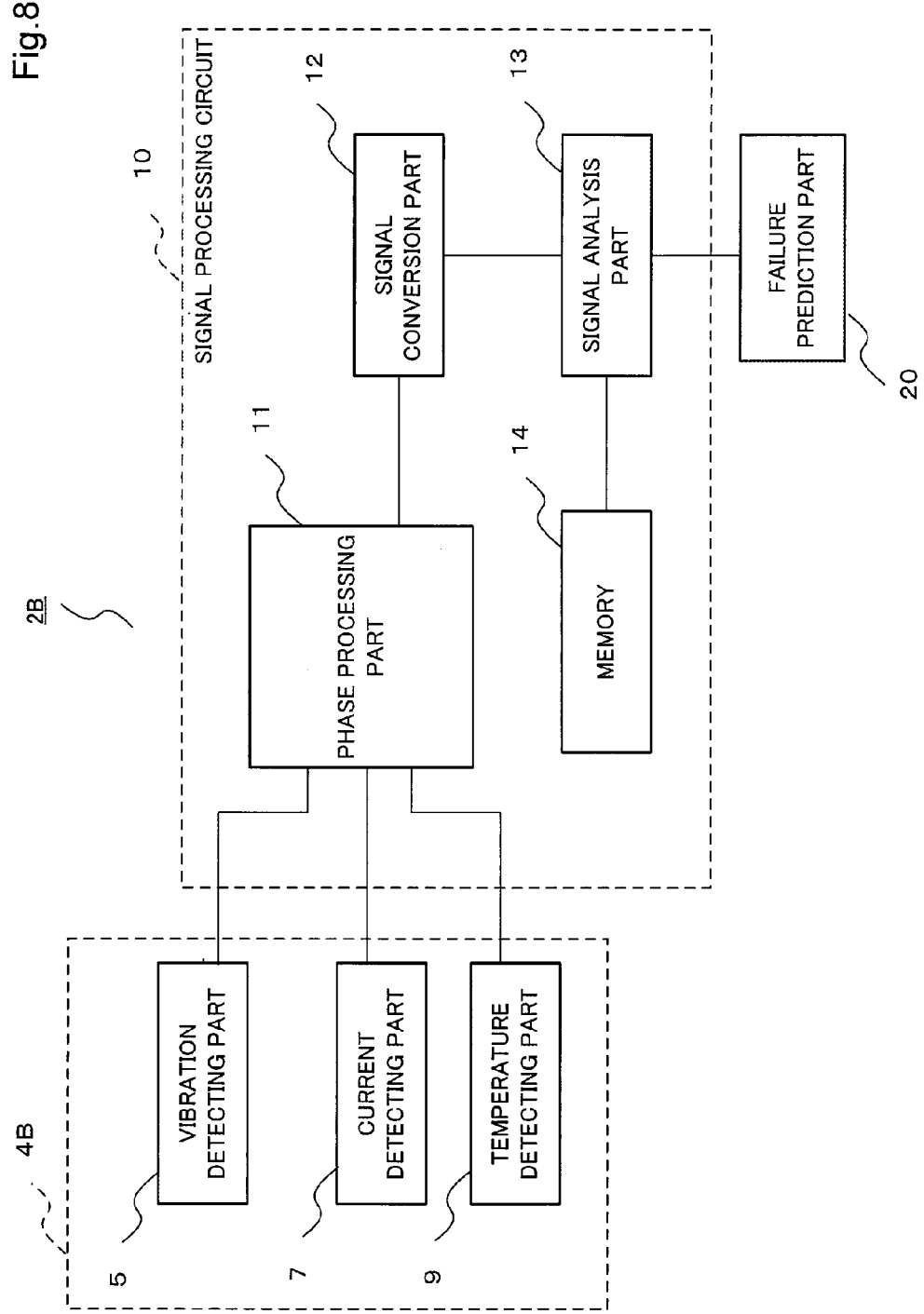
FIG. 8 is a block diagram of a failure prediction system according to a second exemplary embodiment of the present invention.

FIG. 8 is a block diagram of a failure prediction system 2B according to this exemplary embodiment. Compared with the failure prediction system 2A shown in FIG. 1A, a temperature detecting part 9 is added. This temperature detecting part 9 is included in a state detection unit 4B, and detects a temperature of a monitoring target device.

Figure 3:
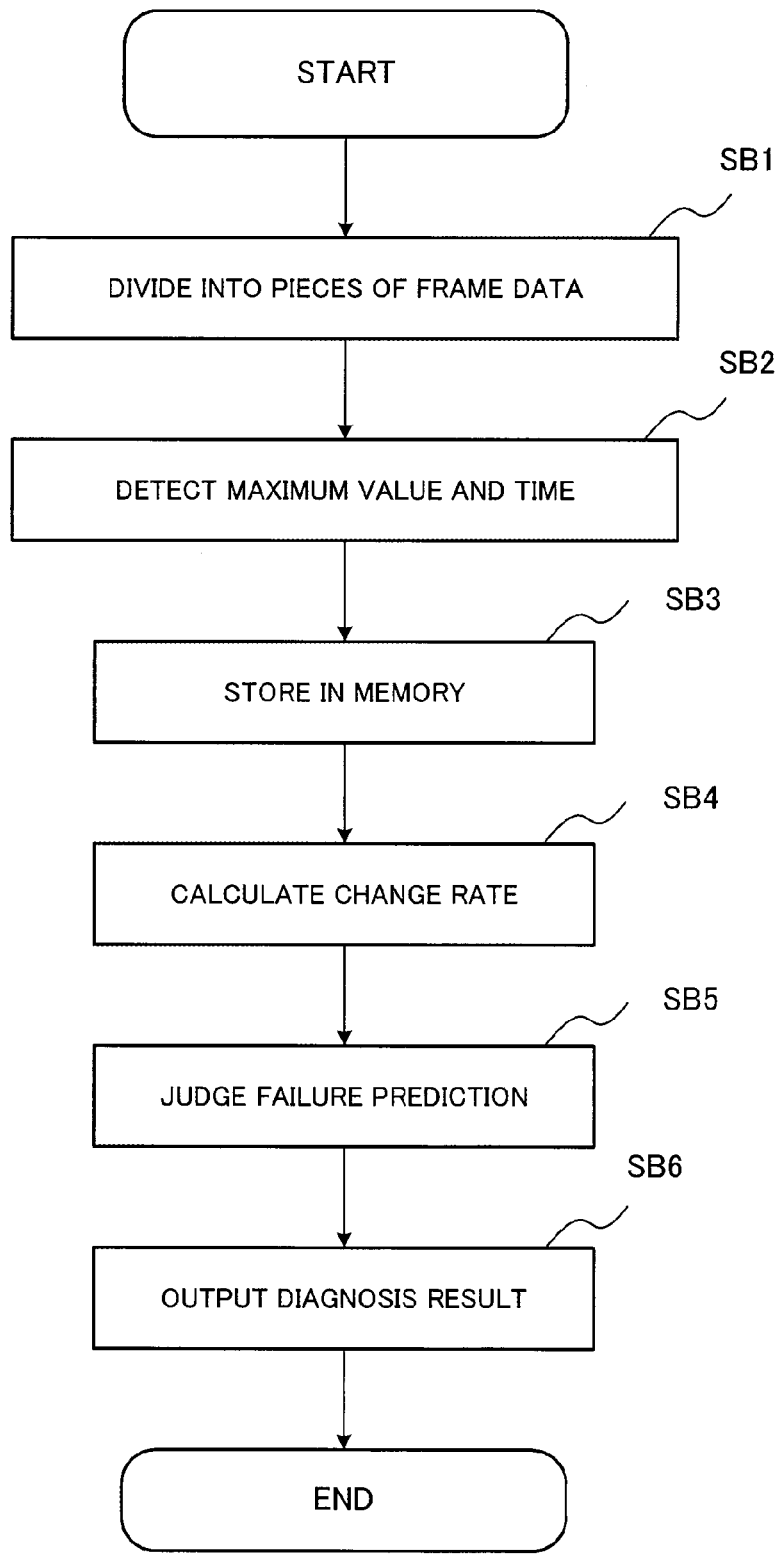
FIG. 3 is a flow chart which shows failure prediction processing of a failure prediction system according to the first exemplary embodiment in detail.

Then, in the change rate calculation procedure (step SB4) shown in FIG. 3, the signal analysis part 13 calculates temperature change rate $\Delta p$ defined in Formula 4.

$$\Delta p = ((\text{temperature maximum value}-\text{temperature initial value})/\text{temperature initial value})*100 \qquad (4)$$

Failure prediction and a failure sign are judged by a big-and-small judgment of this temperature change rate $\Delta p$ and a temperature reference value Dp set in advance. Meanwhile, as the temperature reference value Dp, 50 [%] can be exemplified.

When temperature change rate $\Delta p$ is larger than the temperature reference value Dp ($\Delta p \geq Dp$), a monitoring target device is judged to be in a state of abnormal heat generation. As such abnormal heat generation, a case where temperature rises because an excess current is supplied to a monitoring target device, and a case where a movable mechanism or the like in a monitoring target device is damaged and a temperature rises due to a frictional heat can be exemplified, for example. The failure prediction part 20 predicts a failure when $\Delta p \geq Dp$.

Figure 9:
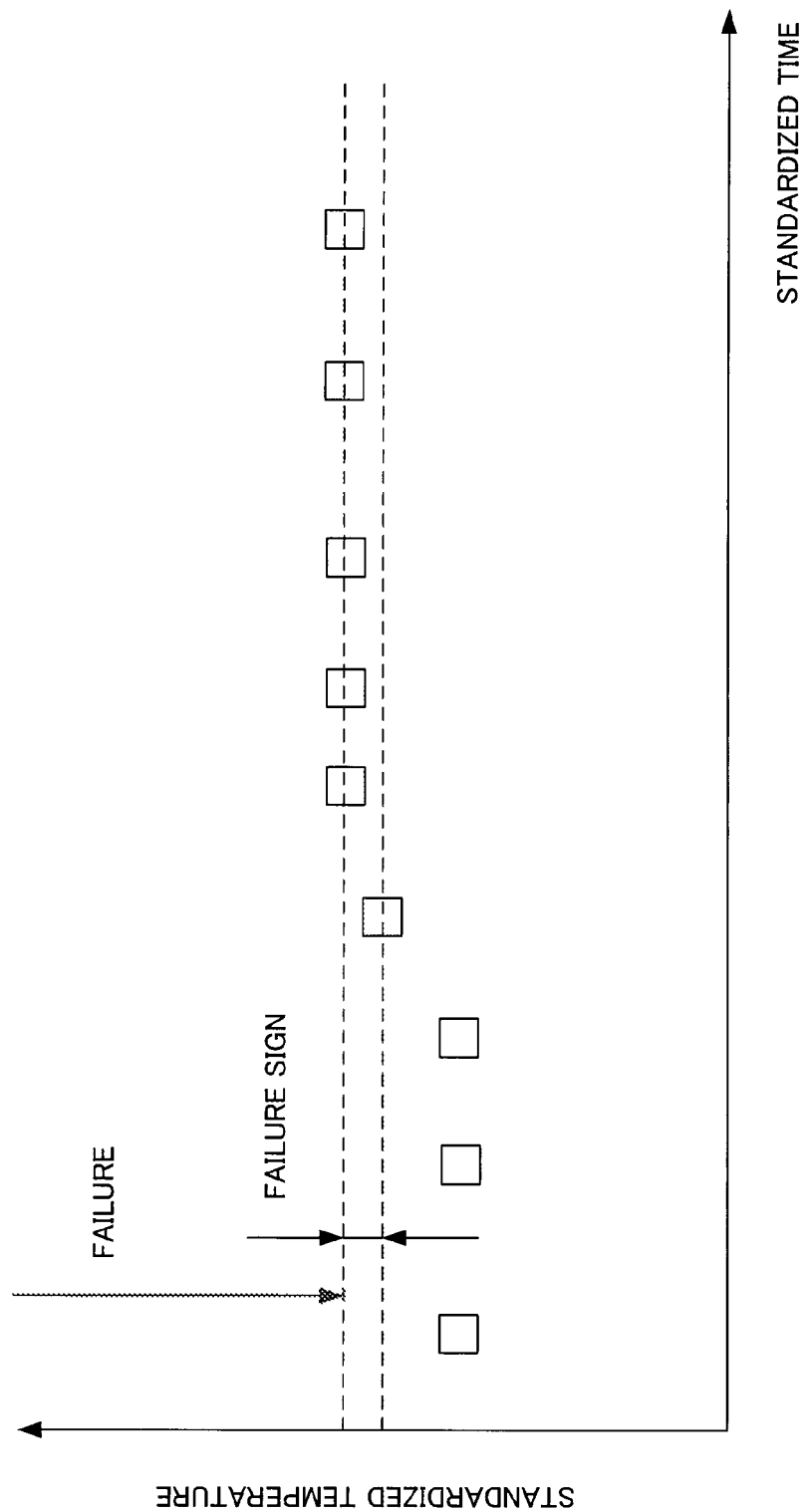
FIG. 9 is a diagram showing an evaluation result of failure prediction performed based on a temperature signal according to the second exemplary embodiment.

FIG. 9 is a diagram showing an evaluation result of performing failure prediction based on a temperature signal. The horizontal axis is a standardized time made by standardizing a maximum amplitude time by the operating time at the time when a monitoring target device has failed, and the vertical axis is a standardized temperature made by standardizing the temperature signal by the temperature when the monitoring target device has failed. As can be understood from FIG. 9, as an operating time increases, a standardized temperature rises, and when it enters a failure area, its value shows almost a fixed value. It can be understood from this that it is possible to predict a failure also by a temperature signal.

Failure prediction can be performed now with a higher degree of accuracy for various abnormality modes by using failure prediction processing based on a temperature change rate together with failure prediction processing by a vibration change rate, a current change rate and a time difference change rate.

Second Exemplary Embodiment

Next, the second exemplary embodiment of the present invention will be described. Meanwhile, description will be omitted appropriately using identical codes about the same structures as the first exemplary embodiment.

A monitoring target device includes various components. For example a personal computer has a fan for cooling a power supply and a CPU, a hard disk and the like. A hard disk includes a spindle motor for rotating a recording medium, and so on.

When a vibration of such system is measured, a vibration including vibrations generated by each part such as a vibration by a fan for cooling and a vibration by a spindle motor in an intermingled manner is detected. Even when the vibration detecting part 5 is fixed to a hard disk, there are cases where a vibration of a fan for cooling may be transmitted to a hard disk and be detected. In particular, when an acceleration sensor is employed as the vibration detecting part 5, there is concern that a vibration by a fan for cooling is detected with a value larger than that of a vibration by a spindle motor because an acceleration sensor detects a vibration sensitively. In such case, when it is judged that a source of a vibration exists in the hard disk, it will be an erroneous judgment. However, while the number of rotations of a fan for cooling is often 1000-3000 rpm, the number of rotations of a spindle motor is often 5000-8000 rpm. Although such number of rotations changes by a technical progress of these parts of course, a fan for cooling is equipment for sending a pressurized air at least, and thus even if it is rotated at a too high speed, the blowing capacity does not increase so much. In contrast, a spindle motor is expected to be of a higher speed rotation further in the future because it should just correspond to a reading speed of a magnetic sensor of a hard disk. Accordingly, a vibration comes to include a vibrational component according to the number of rotations. Performing failure prediction in a manner separating such vibrational components is important to improve reliability of failure prediction. Further, failure prediction of a plurality of parts becomes possible by extracting such vibrational component because a vibrational component of a bandwidth according to a part is included in a detected vibration.

Figure 10:
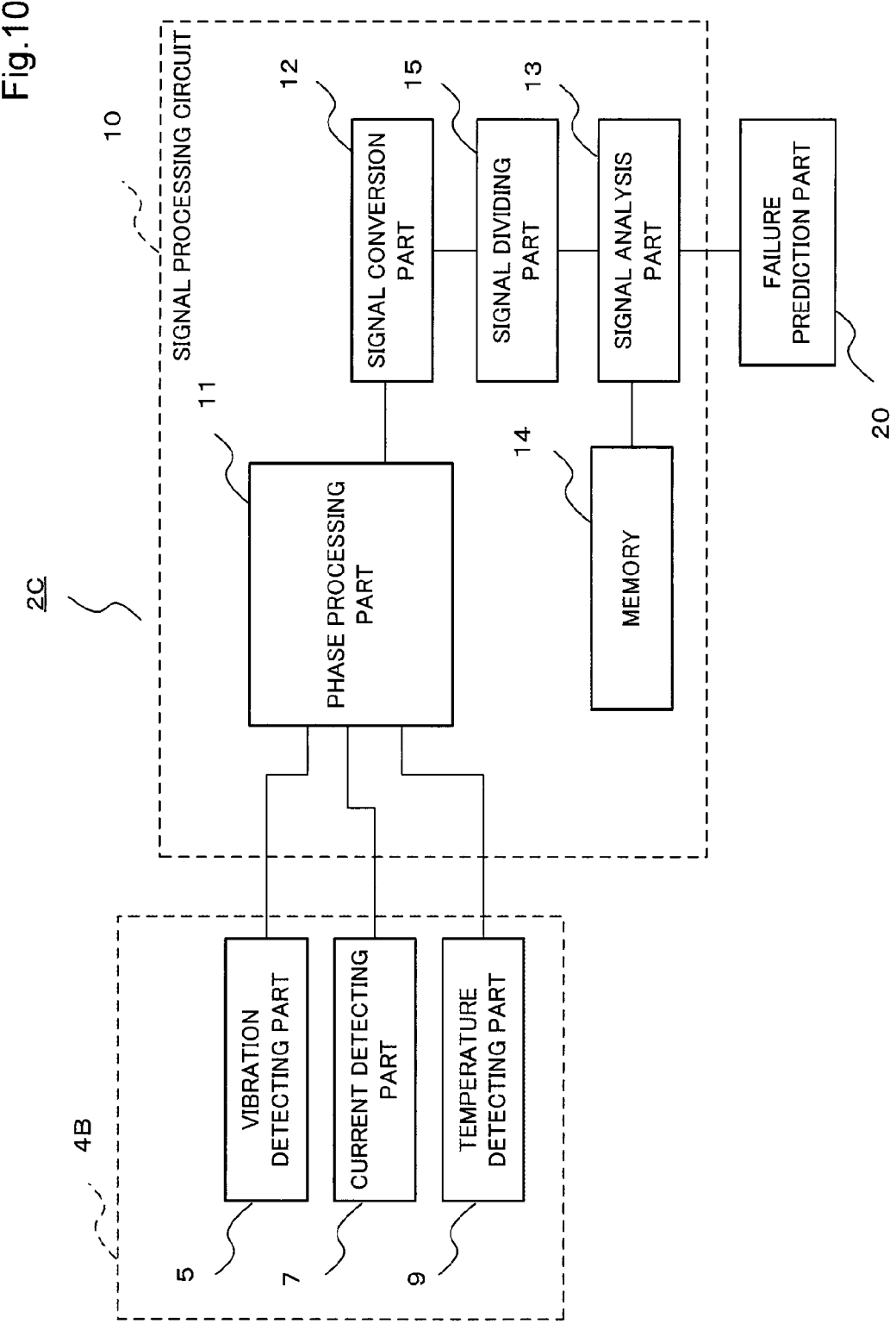
FIG. 10 is a block diagram of a failure prediction system according to a third exemplary embodiment of the present invention.

From such view point, there is provided a signal dividing part 15 that divides a detection signal into a signal for each bandwidth in this exemplary embodiment. FIG. 10 is a block diagram of a failure prediction system 2C according to this exemplary embodiment. The signal dividing part 15 is added to the failure prediction system 2B shown in FIG. 8. This signal dividing part 15 includes a digital filter and the like, and divides an inputted detection signal such as a vibration signal, a current signal and a temperature signal into a signal component for each bandwidth.

However, there is a case where a digital filter is not able to be applied to a temperature signal because its variation with time is small. In such case, because initial value temperatures of a power supply and a hard disk of a personal computer are different in the first place, for example, signal division should be just performed for each temperature band. It is supposed that the signal dividing part 15 also performs such temperature division in this exemplary embodiment.

Figure 11:
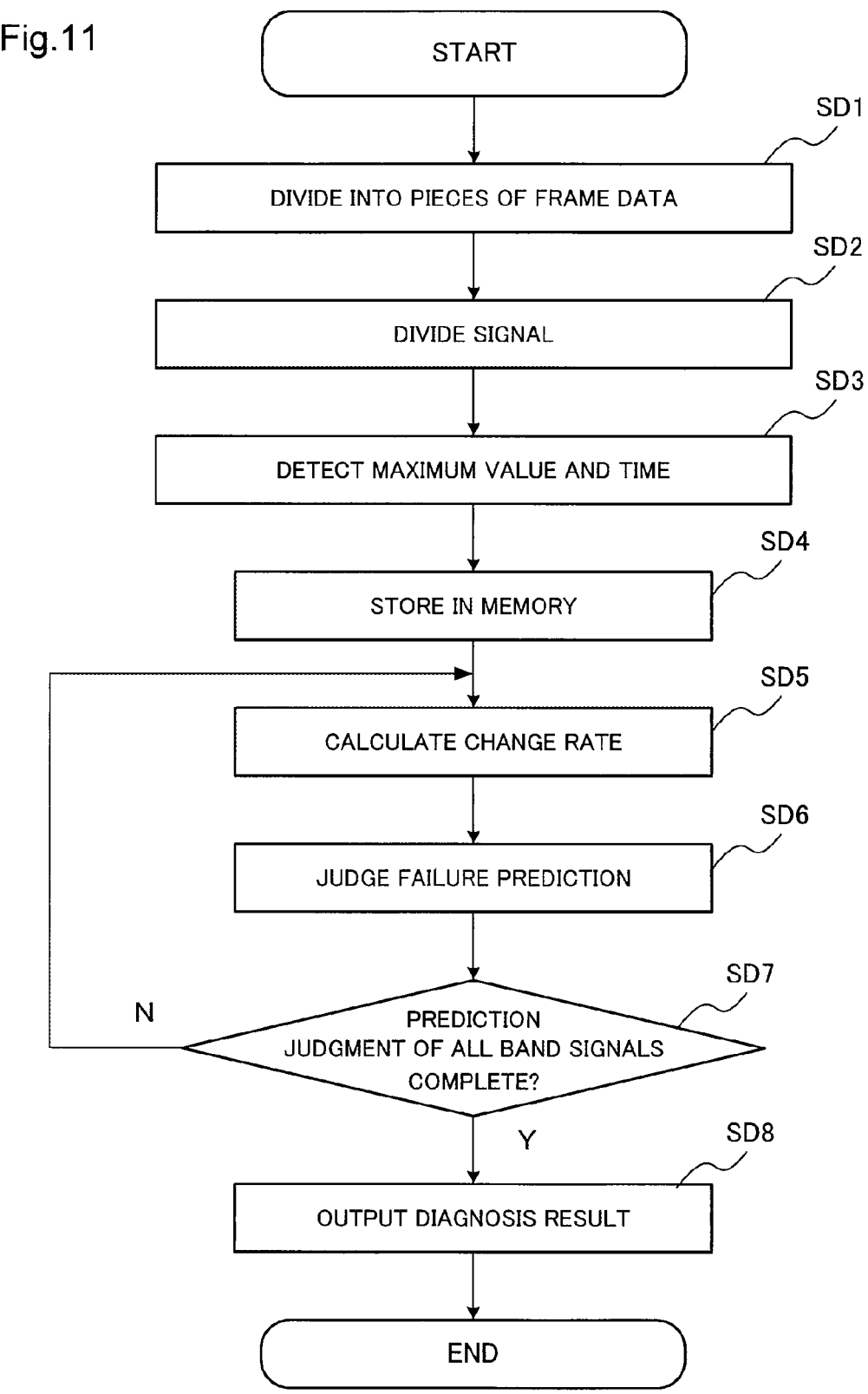
FIG. 11 is a flow chart which indicates a failure prediction procedure in a failure prediction system according to the third exemplary embodiment.

FIG. 11 is a flow chart which indicates a failure prediction procedure in the failure prediction system 2C according to this exemplary embodiment. Meanwhile, step SD1 corresponds to step SB1 shown in FIG. 3, and step SD3-step SD6 correspond to step SB2-step SB5 shown in FIG. 3, and thus description of these will be omitted.

When a vibration signal, a current signal and a temperature signal are acquired in a manner divided into pieces of frame data, the signal dividing part 15 divides these detection signals for each frequency band or for each temperature band further. As a result, one piece of frame data becomes a plurality of pieces of data according to the number of pieces of division. Hereinafter, a signal divided by the signal dividing part 15 is called a band signal.

The signal analysis part 13 acquires a maximum value and time when it has occurred for each band signal and stores these in the memory 14 (step SD4), and calculates vibration change rate Δm, current change rate Δc and time change rate Δt (step SD5).

Next, by performing big-and-small comparison between the calculated vibration change rates or the like and the vibration reference value or the like, the failure prediction part 20 conducts failure prediction having been described above. After that, the failure prediction part 20 judges whether failure prediction has been performed to all band signals or not, and, when there is a band signal for which judgment has not been done yet, returns to step SD5. On the other hand, when failure prediction has been performed to all band signals, it advances towards step SD8.

The failure prediction part 20 outputs a failure prediction result for each band signal. At that time, it is possible to assign a component to a band. For example, it is supposed that a vibration source of a band signal of a frequency of 1000-3000 Hz is a fan for cooling, and a vibration source of a band signal of a frequency of 5000-8000 Hz is a spindle motor of a hard disk. Accordingly, results acquired by performing failure prediction based on such band signal can be made to be failure prediction for a fan for cooling and for a spindle motor.

As it has been described above, because a vibration signal and the like is divided into band signals, and a failure prediction judgment is performed for each band signal, it is possible to judge correct and highly accurate failure prediction, and to detect a failure sign. Further, because failure prediction is performed to a plurality of detection signals, failure prediction of a lot of components can be performed now without setting up many detecting parts.

INDUSTRIAL APPLICABILITY

The present invention can be applied to failure prediction, a failure forecast and the like of an electronic device such as a cellular phone, a notebook-sized personal computer and a Personal Digital Assistance.

This application claims priority based on Japanese application Japanese Patent Application No. 2011-181691, filed on Aug. 23, 2011, the disclosure of which is incorporated herein in its entirety.

The features of the present invention that has been described above are collected as supplementary notes below.

[Supplementary Note 1]

A failure prediction system for performing failure prediction to a monitoring target device by detecting a state, comprising:

a state detection unit for detecting state signals of no smaller than two different kinds, and outputting a detection signal corresponding to each of the state signals;

a phase processing part for synchronizing a plurality of the detection signals;

a signal analysis part for calculating a feature value indicating a feature of the state for each of the detection signals from the phase processing part; and a failure prediction part for performing failure prediction of the monitoring target device for each of the feature values by comparing the feature value in question and a reference value set in advance.

[Supplementary Note 2]

The failure prediction system according to supplementary note 1, further comprising a signal dividing part for separating the detection signal outputted from the phase processing part into a plurality of band signals.

[Supplementary Note 3]

The failure prediction system according to supplementary note 1 or 2, wherein the signal analysis part acquires in a predetermined time interval the detection signal having been inputted, and makes the detection signal having been acquired be frame data.

[Supplementary Note 4]

The failure prediction system according to any one of supplementary notes 1 to 3, wherein the state signals are at least two among a vibration, an electric current and a temperature of the monitoring target device.

[Supplementary Note 5]

The failure prediction system according to any one of supplementary notes 1 to 4, wherein the state detection unit includes at least one of: an acceleration sensor of a piezoelectric type for detecting a vibration of the monitoring target device; and a Hall sensor for detecting an electric current supplied to the monitoring target device.

[Supplementary Note 6]

The failure prediction system according to any one of supplementary notes 1 to 5, wherein the signal analysis part performs failure prediction by acquiring a time of detecting the feature value as a feature time and comparing a rate of change of a time difference of the feature time relative to different one of the state signals with the reference value set in advance.

[Supplementary Note 7]

The failure prediction system according to any one of supplementary notes 1 to 6, wherein the failure prediction part performs detailed failure prediction of the monitoring target device by making pieces of failure prediction based on a plurality of the feature values complement with each other.

[Supplementary Note 8]

The failure prediction system according to supplementary note 2, wherein the failure prediction part performs failure prediction of the monitoring target device and a device besides the monitoring target device based on information set in advance for a band of the band signal.

[Supplementary Note 9]

A failure prediction method for performing failure prediction to a monitoring target device by detecting a state, comprising:

a detection procedure for detecting state signals of no smaller than two different kinds, and outputting a detection signal corresponding to each of the state signals;

a phase processing procedure for synchronizing a plurality of the detection signals;

a signal analysis procedure for calculating a feature value indicating a feature of the state for each of the detection signals from the phase processing part; and a failure prediction procedure for performing failure prediction of the monitoring target device for each of the feature values by comparing the feature value in question and a reference value set in advance.

[Supplementary Note 10]

The failure prediction method according to supplementary note 9, further comprising a signal division procedure for separating the detection signal outputted from the phase processing part into a plurality of band signals.

[Supplementary Note 11]

The failure prediction method according to supplementary note 9 or 10, wherein the signal analysis procedure includes a procedure to acquire in a predetermined time interval the detection signal having been inputted, and make the detection signal having been acquired be frame data.

[Supplementary Note 12]

The failure prediction method according to any one of supplementary notes 9 to 11, wherein the state signals are at least two among a vibration, an electric current and a temperature of the monitoring target device.

[Supplementary Note 13]

The failure prediction method according to any one of supplementary notes 9 to 12, wherein the state detection procedure detects a signal by at least one of: an acceleration sensor of a piezoelectric type for detecting a vibration of the monitoring target device; and a Hall sensor for detecting an electric current supplied to the monitoring target device.

[Supplementary Note 14]

The failure prediction method according to any one of supplementary notes 9 to 13, wherein.

the signal analysis procedure includes a procedure to perform failure prediction by acquiring a time of detecting the feature value as a feature time and compare a rate of change of a time difference of the feature time relative to different one of the state signals with the reference value set in advance.

[Supplementary Note 15]

The failure prediction method according to any one of supplementary notes 9 to 14, wherein the failure prediction procedure includes a procedure to perform detailed failure prediction of the monitoring target device by making pieces of failure prediction based on a plurality of the feature values complement with each other.

[Supplementary Note 16]

The failure prediction method according to supplementary notes 10 to 15, wherein the failure prediction procedure includes a procedure to perform failure prediction of the monitoring target device and a device besides the monitoring target device based on information set in advance for a band of the band signal.

| Description of Symbols | |
|---|---|
| 2A-2C | Failure prediction system |
| 4A | State detection unit |
| 4B | State detection unit |
| 5 | Vibration detecting part |
| 7 | Current detecting part |
| 9 | Temperature detecting part |
| 10 | Signal processing circuit |
| 11 | Phase processing part |
| 12 | Signal conversion part |
| 13 | Signal analysis part |
| 14 | Memory |
| 15 | Signal dividing part |
| 20 | Failure prediction part |

The invention claimed is:

1. A failure prediction system for performing failure prediction to a monitoring target device by detecting a state, comprising:

a state detection unit which detects state signals of no smaller than two different kinds, and outputting a detection signal corresponding to each of the state signals;

a phase processing part which synchronizes a plurality of the detection signals;

a signal analysis part which calculates a feature value indicating a feature of the state for each of the detection signals from the phase processing part; and a failure prediction part which performs failure prediction of the monitoring target device for each of the feature values by comparing the feature value in question and a reference value set in advance.

2. The failure prediction system according to claim 1, further comprising a signal dividing part which separates the detection signal outputted from the phase processing part into a plurality of band signals.

3. The failure prediction system according to claim 2, wherein the failure prediction part performs failure prediction of the monitoring target device and a device besides the monitoring target device based on information set in advance for a band of the band signal.

4. The failure prediction system according to claim 1, wherein the signal analysis part acquires in a predetermined time interval the detection signal having been inputted, and makes the detection signal having been acquired be frame data.

5. The failure prediction system according to claim 1, wherein the state signals are at least two among a vibration, an electric current and a temperature of the monitoring target device.

6. The failure prediction system according to claim 1, wherein the state detection unit includes at least one of an acceleration sensor of a piezoelectric type for detecting a vibration of the monitoring target device, and a Hall sensor for detecting an electric current supplied to the monitoring target device.

7. The failure prediction system according to claim 1, wherein the signal analysis part performs failure prediction by acquiring a time of detecting the feature value as a feature time and comparing a rate of change of a time difference of the feature time relative to different one of the state signals with the reference value set in advance.

8. The failure prediction system according to claim 1, wherein the failure prediction part performs detailed failure prediction of the monitoring target device by making pieces of failure prediction based on a plurality of the feature values complement with each other.

9. A failure prediction method for performing failure prediction to a monitoring target device by detecting a state, comprising:

a detection procedure for detecting state signals of no smaller than two different kinds, and outputting a detection signal corresponding to each of the state signals;

a phase processing procedure for synchronizing a plurality of the detection signals;

a signal analysis procedure for calculating a feature value indicating a feature of the state for each of the detection signals from the phase processing part; and a failure prediction procedure for performing failure prediction of the monitoring target device for each of the feature values by comparing the feature value in question and a reference value set in advance.

10. The failure prediction method according to claim 9, further comprising a signal division procedure for separating the detection signal outputted from the phase processing part into a plurality of band signals.

11. The failure prediction method according to claim 10, wherein
the failure prediction procedure includes a procedure to perform failure prediction of the monitoring target device and a device besides the monitoring target device based on information set in advance for a band of the band signal.

12. The failure prediction method according to claim 9, wherein
the signal analysis procedure includes a procedure to acquire in a predetermined time interval the detection signal having been inputted, and make the detection signal having been acquired be frame data.

13. The failure prediction method according to claim 9, wherein
the state signals are at least two among a vibration, an electric current and a temperature of the monitoring target device.

14. The failure prediction method according to claim 9, wherein
the state detection procedure detects a signal by at least one of an acceleration sensor of a piezoelectric type for detecting a vibration of the monitoring target device, and a Hall sensor for detecting an electric current supplied to the monitoring target device.

15. The failure prediction method according to claim 9, wherein
the signal analysis procedure includes a procedure to perform failure prediction by acquiring a time of detecting the feature value as a feature time and compare a rate of change of a time difference of the feature time relative to different one of the state signals with the reference value set in advance.

16. The failure prediction method according to claim 9, wherein
the failure prediction procedure includes a procedure to perform detailed failure prediction of the monitoring target device by making pieces of failure prediction based on a plurality of the feature values complement with each other.

* * * * *